No. 11,901.
Reissued Apr. 2, 1901.
W. D. HOXIE.
SECTIONAL STEAM GENERATOR.
(Application filed June 13, 1900.)
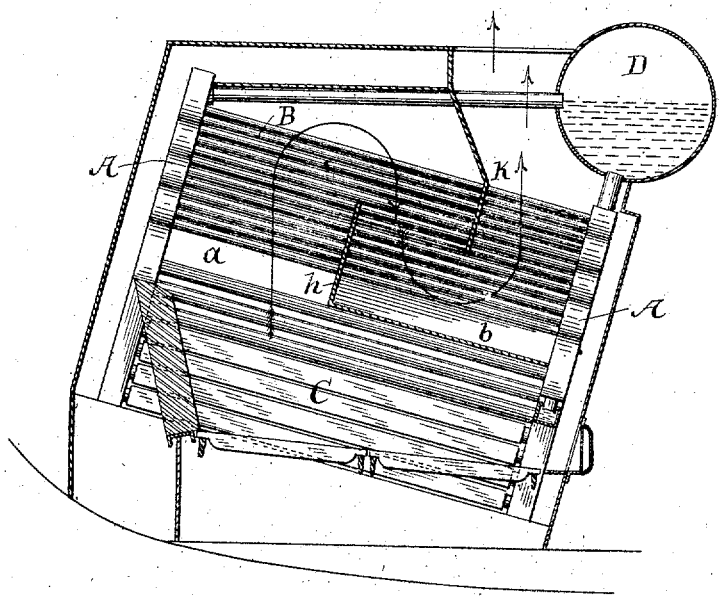
WITNESSES:
Charles Hanimann
H. L. Beil
INVENTOR
William D. Hoxie
BY
Chas. W. Forbes
ATTORNEY

UNITED STATES PATENT OFFICE.

WILLIAM D. HOXIE, OF NEW YORK, (BROOKLYN,) NEW YORK, ASSIGNOR TO THE BABCOCK & WILCOX COMPANY, OF NEW YORK, N. Y.

SECTIONAL STEAM-GENERATOR.

SPECIFICATION forming part of Reissued Letters Patent No. 11,901, dated April 2, 1901.

Original No. 638,716, dated December 12, 1899. Application for reissue filed June 13, 1900. Serial No. 20,188.

*To all whom it may concern:*

Be it known that I, WILLIAM D. HOXIE, a citizen of the United States, residing at New York, borough of Brooklyn, in the county of Kings and State of New York, have invented a certain new and useful Improvement in Sectional Steam-Generators, of which the following is a specification, reference being had therein to the accompanying drawing.

This invention is particularly designed as an improvement in the type of generator referred to in Letters Patent granted to me December 21, 1897, No. 595,852. In the patent referred to a water-tube generator is shown, with the water-tubes inclined at an obtuse angle with the front or vertical face of the generator, thus increasing the capacity of the combustion-chamber of the furnace and providing space for the steam and water drum within the height of space occupied by the inclined tubes. In the generator referred to in the patent the products of combustion are permitted to pass from the furnace directly up and among the inclined water-tubes and adjacent to the drum to the escape-passage or uptake.

The object of the present improvement is to reverberate and expand the products of combustion within the furnace-chamber and to direct the expanding volume of the gases therefrom to and across the end portion of the water-tubes and to recross the water-tubes throughout their entire length, all as hereinafter described.

In the accompanying drawing the figure represents a side elevation of the generator, showing the disposition of the baffles.

The relative arrangements of the main parts of the generator herein shown are substantially similar to the corresponding parts illustrated in the prior patent referred to, A A representing the headers; B, the intermediate inclined water-tubes; C, the furnace, and D the elevated steam and water drum. The inclined water-tubes are shown of different sizes, similar to those shown in the patent referred to, the larger tubes with intermediate spaces being located directly above the furnace.

In the present structure a greater space *a* is designed between the inclined clusters of the different sizes of water-tubes to provide a chamber for greater expansion of the products of combustion and to locate the accumulation of ashes and dirt and facilitate their removal.

The furnace-roof and baffle-plates are preferably arranged as shown in the drawing, the roof *b* at the top of the lower series of water-tubes and at the bottom of the chamber *a* and extending from the front header partially over the furnace forming a reverberatory surface for the products of combustion from beneath and an ash-receptacle from above. At the end of the roof *b* the baffle *h* is placed, extending upward across the chamber *a* and about half the depth of the cluster of inclined water-tubes. About midway of the chamber formed by the roof *b* and the baffle *h* another baffle *k* is fixed, which depends from the top of the generator and also extends about half the depth of the cluster of water-tubes. This arrangement of the roof and baffles, as clearly illustrated, causes the products of combustion to reverberate within the furnace and to follow the course indicated by the arrows to the escape or uptake, and whereby the expanded gases are thoroughly circulated throughout the chamber *a* and crossed and recrossed among the inclined water-tubes, and by the increased distance they are required to travel their effective heat is not only fully absorbed, but applied at the most advantageous points. This relative arrangement of the baffles is especially advantageous in association with the enlarged portion of the combustion-chamber of the furnace, wherein a much greater degree of expansion of the gases takes place than in furnaces of ordinary construction, and, further, in connection with the supplementary expansion-chamber *a*. This latter part of my invention also provides for the concentration of ashes and dust upon the inclined roof *b*, from which they can be readily removed through a cleaning-door communicating therewith at the side of the generator.

Having thus fully described my invention, what I claim, and desire to secure by Letters Patent, is—

1. In a sectional steam-generator, the combination with water-tubes, elevated at one end whereby enlarged space is provided in the furnace-chamber, of a reverberatory roof *b* extending partially over the furnace-chamber, a baffle *h* extending therefrom partially across the tubes, and a succeeding baffle *k* depending partially across the tubes, whereby the products of combustion are reverberated within the furnace, expanded within its enlarged chamber, and directed to and across an end portion of the tubes and recrossed throughout the length of the tubes to the uptake, substantially as described.

2. In a sectional steam-generator, the combination with water-tubes inclined upwardly from the front of the generator whereby an enlarged space is provided at the rear of the furnace-chamber and wherein the gases of combustion are expanded, of a reverberatory roof extending from the front partially over the furnace-chamber, a baffle extending therefrom partially across the tubes and directing the gases across the elevated portion of the water-tubes, and a succeeding baffle directing the escaping gases to recross the tubes, substantially as described.

3. The combination in a sectional steam-generator of a double series of water-tubes both inclined upwardly from the front of the generator and separated by an expanding-chamber *a*, a reverberatory roof *b* located at the top of the lower series of water-tubes, and extending from the front partially over the furnace, a baffle *h* extending upward from the inner end of the roof *b* across the chamber *a* and partially across the water-tubes, and a succeeding baffle *k* depending from the top of the generator partially across the water-tubes, substantially as described.

4. In a sectional steam-generator, the combination with inclined water-tubes, whereby space is provided practically within the height of space occupied by the inclined tubes; above the tubes for the steam and water drum, and below the tubes providing an enlargement of the combustion-chamber of the furnace, of a reverberatory roof extending partially over the furnace-chamber, a baffle extending therefrom partially across the tubes, and a succeeding baffle depending partially across the tubes, whereby the escaping products of combustion are directed by said baffle across an end portion of the tubes and recrossed throughout the length of the tubes to the uptake, substantially as described.

In testimony whereof I affix my signature in presence of two witnesses.

WILLIAM D. HOXIE.

Witnesses:
WM. H. BARNES,
CHAS. W. FORBES.